Reissued Feb. 19, 1935 Re. 19,470

UNITED STATES PATENT OFFICE 19,470

PAPER PULP BLEACHING PROCESS

Wilhelm Hirschkind, Berkeley, Calif., assignor to Great Western Electro-Chemical Co., San Francisco, Calif., a corporation of California No Drawing. Original No. 1,873,924, dated August 23, 1932, Serial No. 323,575, December 3, 1928 Application for reissue October 22, 1934, Serial No. 749,362

5 Claims. (Cl. 8—2)

This invention relates to the bleaching of ground wood or mechanical pulp and the object of the process is to lighten the color of a mechanical pulp while maintaining the strength and yield of paper at a maximum from the bleached mechanical pulp.

The purpose of my process is not to produce highly bleached or white pulp but rather to cause a lightening of the original dark color of a mechanical pulp. Ground wood pulp can not be converted into a white pulp because all of the lignin and incrusting matters are still present. This precludes the use of oxidizing agents as for instance chlorine so necessary for producing white pulp. The dark color of such pulp can be lightened somewhat by treatment with reducing agents, and some of these have been so used for some time.

Sulphur dioxide gas or bisulphite liquor will brighten or lighten dark mechanical pulps to some extent. The action however is slow and the quantity of sulphite necessary is considerable.

I have discovered that the compound, sodium hydrosulphite of the chemical composition $Na_2S_2O_4$ has a lightening action on the color of ground wood pulp infinitely greater and far more rapid than sulphur dioxide or bisulphites. I found that sodium hydrosulphite when added to very darkly colored mechanical wood pulp in a quantity of one quarter of one percent by weight and thoroughly mixed therewith in the presence of water, produced a lightening of the color far beyond any effect obtainable with sulphur dioxide or the bisulphites, and that the whole process was completed in very few minutes.

Ground wood which has been in storage for some time gradually darkens and produces a paper, after treatment in the ordinary way, which is considerably off color. A hydrosulphite added to the pulp in quantities of as little as one quarter of one per cent of the weight of the dry ground wood pulp will bring back the color of fresh ground wood, and a very small additional quantity will lighten the color beyond the original color.

I have already mentioned the rapidity of the action of the hydrosulphite in treatment of paper pulp and it is quite remarkable that this action is hardly influenced by temperature ranges between 50° F. and 120° F. so that at the rather low temperatures of approximately 50° F. the effect is just the same. The temperature of the pulp suspension during the treatment may vary widely without affecting the treatment and the process therefore can be carried out at the normal temperatures maintaining in the room in which the process is carried out without substantially adding or subtracting heat to or from the pulp suspension.

Sodium hydrosulphite has been mentioned above because it is the cheapest and best known representative of these compounds. But other hydrosulphites, such as potassium or ammonium hydrosulphite, calcium, or those of the alkaline earth group have been used by me with satisfactory results, and zinc hydrosulphite ($ZnS_2O_4$) which is particularly easy to manufacture has also been found suitable for this purpose.

A further advantage of the use of a hydrosulphite for the bleaching of mechanical pulp is the ease of its application. It can be dissolved in water and run as an aqueous solution into a mixer or beater where the pulp is being mixed, or it can be added as a solid direct to the wet pulp and thoroughly incorporated therewith. Since the reaction is completed within very few minutes it is only necessary to add the hydrosulphite to the beater or mixer in which the pulp is agitated before going to the paper machines.

As an example of its application to news print paper 2,300 pounds of ground wood pulp were mixed with 400 pounds of sulphite pulp to a stock density of approximately five per cent. Five and three-quarter pounds of anhydrous sodium hydrosulfite were added to this mixture. Ten minutes later the pulp was conditioned by adding the necessary sizing and bluing ingredients to the bath and the material was run directly onto the paper machine.

News print paper resulting from a mixture of about 83% ground wood to about 17% bleached sulphite pulp may be closely approximated in grade by using unbleached sulphite pulp with the ground wood if a small quantity of a hydrosulphite is incorporated in the proportions indicated. The advantages are in substituting the cheaper unbleached sulphite pulp for the bleached pulp ordinarily required.

Since various quantities of the chemical from .25% to 10% of the weight of the pulp produce corresponding degrees of action on the color of the pulp, the amount to be used will be governed entirely by the effects desired and I do not confine myself to any particular quantity or percentage of the chemical to the pulp treated.

I claim

1. The process of lightening the color of mechanical wood pulp which comprises agitating the same substantially at room temperature for about ten minutes with an aqueous solution of a hydrosulphite as substantially the only active agent therein and in amount ranging from .25% to 10% of the weight of the pulp and thereby obtaining a bleached mechanical wood pulp suitable for direct conversion into paper without subsequent washing.

2. The process of lightening the color of mechanical wood pulp which comprises agitating the same substantially at room temperature for about ten minutes with an aqueous solution of sodium hydrosulphite substantially as the only active agent therein and in amount ranging from .25% to 10% of the weight of the pulp and thereby obtaining a bleached mechanical wood pulp suitable for direct conversion into paper without subsequent washing.

3. The process of making paper from mechanical wood pulp, which comprises agitating the pulp at substantially room temperature for a short time with an aqueous solution of a hydrosulphite as substantially the only active bleaching agent therein and in amount ranging from .25% to 10% of the weight of the pulp, and without subsequent washing converting the pulp into paper before reversion of color can take place in the pulp.

4. The process of making a paper from a dark mechanical wood pulp which consists in reducing coloring matter in said dark pulp by agitating an aqueous suspension of said dark pulp for a short time at substantially room temperature with a hydrosulphite present as substantially the only active bleaching agent in an amount ranging from 0.25% to 10% of the weight of pulp in said suspension and then conditioning the bleached pulp for formation into paper and directly converting said reduced pulp containing reduced coloring matter into paper before reversion of color can take place in said reduced pulp due to oxidation of said reduced coloring matter.

5. The process of making a paper from a mechanical wood pulp which consists in forming a suspension of said pulp in water, agitating said suspended pulp for a short time at about room temperature with a hydrosulphite present as the only active bleaching agent in an amount ranging from 0.25% to 10% of said pulp to bleach said pulp, then conditioning the bleached pulp for formation into paper, and directly converting said conditioned and bleached pulp into paper.

WILHELM HIRSCHKIND.